United States Patent [19]
Henfrey et al.

[11] 3,992,503
[45] Nov. 16, 1976

[54] METHOD OF INJECTION MOLDING PIPE

[75] Inventors: Basil Henfrey, Kloof; Kenneth R. Hart, Durban, both of South Africa

[73] Assignee: Duropenta Holdings (Proprietary) Limited, New Germany, Natal, South Africa

[22] Filed: May 16, 1975

[21] Appl. No.: 578,333

Related U.S. Application Data

[63] Continuation-in-part of Ser. No. 359,125, May 10, 1973, abandoned.

[30] Foreign Application Priority Data
June 4, 1974  South Africa.................... 74/3527

[52] U.S. Cl.......................... 264/167; 264/255; 264/294; 264/328; 264/331; 264/334
[51] Int. Cl.²................. B29D 23/02; B29D 23/08
[58] Field of Search.......... 264/167, 250, 255, 259, 264/294, 299, 318, 328, 329, 331, 334, DIG. 34, 148, 150; 164/113; 425/DIG. 34

[56] References Cited
UNITED STATES PATENTS

| 857,589 | 6/1907 | Boyle | 264/33 |
|---|---|---|---|
| 950,578 | 3/1910 | Schmidt | 138/177 X |
| 1,037,709 | 9/1912 | Zieg | 138/172 X |
| 1,940,657 | 12/1933 | Woodford | 138/172 X |
| 1,958,835 | 5/1934 | Norman | 138/177 R |
| 3,192,298 | 6/1965 | Fisher | 264/167 |
| 3,298,064 | 1/1967 | Taga | 264/209 |
| 3,765,811 | 10/1973 | Sawada | 264/172 |

FOREIGN PATENTS OR APPLICATIONS

| 1,091,056 | 11/1967 | United Kingdom | 138/172 |

*Primary Examiner*—Willard E. Hoag
*Attorney, Agent, or Firm*—Cushman, Darby & Cushman

[57] ABSTRACT

A method of manufacturing continuous ribbed pipes of thermoplastic resin material comprises the following successive steps. A length of pipe is injection moulded in a mould cavity between male and female moulds, the latter being shaped to provide integral ribbing on the outer surface of the pipe. After sufficient setting, the female mould is disengaged and the pipe length is ejected along the male mould whereupon the female mould is re-engaged with the one end of the formed pipe forming a closure for the mould cavity. Further material is again injected into the cavity which fuses with said one pipe end and which forms a further pipe length. These steps are repeated until the desired length of pipe is formed and plunger means are provided to effect the pipe ejection above and to close the other end of the mould cavity during injection.

14 Claims, 4 Drawing Figures

METHOD OF INJECTION MOLDING PIPE

CROSS REFERENCES TO RELATED APPLICATIONS

The present application is a continuation in part of our U.S. Patent Application Ser. No. 359,125 filed May 10, 1973 now abandoned.

BACKGROUND OF THE INVENTION

This invention relates to pipes and more particularly to large diameter plastic pipes of the type used mainly in underground applications.

Plastic pipes for use in underground sewerage and drainage applications are usually manufactured by means of an extrusion process. The wall thickness of these pipes is considerable, in view of the crushing strength required of the pipes. To reduce costs, a pipe of lesser wall thickness has been proposed which is extruded with a continuous, single spiral rib thereon. A continuous spiral rib, however, does not provide as much strength against crushing, as for instance, do discontinuous transverse circumferential ribs. Thus, the very nature of an extrusion process to form a plastic pipe, particularly a large diameter pipe, is unsuited to the making of pipes with discontinuous transverse ribs and accordingly is unsuited to the making of pipes having relatively thin walls yet possessing the required crush resistant characteristics.

Attention was therefore directed to an injection moulding process. Such a process while overcoming the problem outlined above, nevertheless suffers the disadvantage of requiring a separate mould for each different length of pipe. The separate manufacture of pipes of differing lengths would inevitably lead to relatively expensive products, this being particularly the case where pipe lengths of 10 meters or more are required.

The transportation and handling of pipes in the rough and confined spaces generally encountered in drainage installation and the like also requires the pipes to be relatively light weight without impairing their strength characteristics.

SUMMARY OF THE INVENTION

Accordingly, it is an object of this invention to provide a method of manufacturing pipes of the type specified having suitable ribbed formations integral therewith which method employs injection moulding and provides relatively inexpensive pipes.

According to this invention there is provided a method of manufacturing continuous ribbed pipes of thermoplastic resin material in a stepwise manner comprising the successive steps of: (a) injection moulding a length of pipe in a mould cavity between male and female moulds, the female moulds shaped to provide integral ribbing in the pipe on its outer surface; (b) after moulding, disengaging the female mould from the moulded pipe length and ejecting the length of pipe thus formed along the male mould with a plunger means guided for movement along the male mould; (c) engaging the female mould with an inner end of the thus-moulded pipe length to form a closure to the mould cavity at one end thereof; (d) injecting further material into the mould cavity to form a further length of pipe homogeneously fused with the first pipe length; and (e) repeating steps (a) through (d), inclusive, in successive order until a pipe of the desired length is formed; the plunger means during successive steps (a) adapted to close the end of the mould cavity opposite the end closed by the inner end of the moulded pipe length.

Further features of the invention provide for the synthetic resin plastics material to contain filler and/or reinforcing material, for the mould cavity to be closed by a closure member to enable moulding of the first length of pipe to be effected and for the inner end of the pipe length to be shaped so as to enhance jointing with a subsequent pipe length.

Yet further features of the invention provide for the plastics material to be foamed material, for the plastics material to be a suitable polymerized olefin or a copolymer with styrene, particularly polypropelene, and for the end of the first pipe length in the mould cavity to be softened by heating before or during injecting further material into the mould cavity.

By way of example, preferred embodiments of the invention will be described with reference to the accompanying drawings.

DESCRIPTIONS OF THE PREFERRED EMBODIMENTS

In a first embodiment of the invention a pipe 1 of thermoplastic synthetic resin material is to be made with discontinuous transverse ribs 2 and four equally spaced longitudinal ribs 3 forming pockets 11 with the ribs 2. The ribs 2, 3 are to be formed integrally with the pipe 1 on its outer surface to enhance its rigidity.

Figure 1:
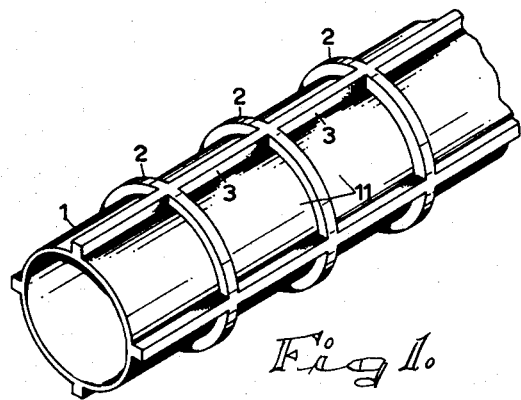
FIG. 1 is a perspective view of part of a length of pipe.
Figure 2:
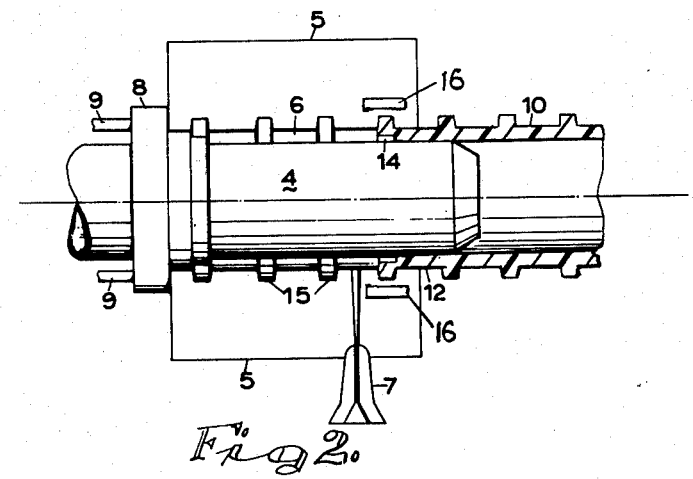
FIG. 2 is a cross-sectional elevation of a schematic mould assembly.

A pipe mould assembly shown schematically in FIG. 2 comprises a male mould in the form of a cylindrical member 4 of circular cross-section and a female split mould in the form of two mould members 5 enclosing the cylindrical member 4. In their operative position the mould members 4 and 5 define a mould cavity 6 therebetween, into which molten plastics material may be injected by means of injecting apparatus 7 in the usual way.

However, the female mould members 5 are arranged not to contact the cylindrical member 4 in their operative position. Thus the cavity 6 has to be closed off at each end of the mould assembly prior to injection of molten plastic.

The mould members 5 are also provided with channels 15 for forming the ribs 2, 3.

A plunger 8 is slidably mounted on the cylindrical member 4 and hydraulically or otherwise operable through a mechanical linkage 9. The plunger is also adapted to close off the mould cavity 6 on one side thereof.

In use, the cavity 6 is closed off on one side by the plunger 8 and on the other side by an additional closure member (not shown). The latter can conveniently be a ring member releasably fitted on the male cylindrical member 4 and similar to the plunger 8.

Molten plastics material is injected into the cavity and when the plastics material has hardened sufficiently the female mould members are lifted off the moulded pipe 10 and the additional closure member is removed. The moulded pipe 10 is axially forced along the cylindrical member 4 by means of the plunger 8 to a position in which the pipe inner end 12 is aligned with the end of the mould assembly. The plunger is returned to its starting position and the female members 5 are returned to the operative position. The inner end 12 of the moulded pipe 10 now forms a closure to the mould cavity 6 on the side of the mould assembly remote from the plunger. Molten plastics material is once more injected into the cavity 8 and fuses with the inner end 12 of the moulded pipe 10. The new length of pipe comprising two short lengths welded at the centre of the length thereof is subsequently displaced as above described. The cycle is repeated until the desired length of ribbed plastic pipe is obtained.

It is to be noted that the inner end 12 of pipe 10 may be shaped to enhance jointing with a subsequent moulded pipe length. In this embodiment of the invention it is moulded with a stepped diameter as at 14, but any suitable formation may be employed.

To facilitate the homogeneous fusion between the end of the pipe formed and the plastics material injected to form the next pipe length, an electrical heating element 16, shown diagrammatically if FIG. 2, is provided in the mould apparatus in the vicinity of the end of the mould cavity. In this embodiment, the element comprises an annular copper-berillium strip. The inner end of the formed pipe length may thus be softened or maintained in a relatively soft state prior to or during injection of further plastics into the mould cavity. Depending on the type of plastics material used, in particular, on its hardening characteristics, and the moulding conditions in general, the heating element may or may not be used to facilitate the fusion or welding together of the adjacent pipe ends.

To reduce the amount of plastics material used to form a pipe, and hence the cost of the pipe filler materials may be added to the synthetic resin prior to the moulding thereof. Also to improve the strength of the pipe, reinforcing materials may be added to the plastics. It is considered that up to approximately 50% of the material injected may comprise filler and/or reinforcing material. Any conventional fillers may be used and particularly suitable as a reinforcing material is glass fibre, preferably treated to improve its bonding with the plastics material.

In a second embodiment of the invention, the plastics material used is foamed inside the mould cavity. In this case, as the plastics material is injected into the mould cavity, it expands to form a foamed structure. The foaming of the material is effected by conventional methods and the resulting pipe has a smooth outer and inner skin. Preferably the foaming is effected to produce a closed cell foamed structure. The thickness of the inner and outer skins can be controlled in known manner. Any suitable plastics material may be used as a polymerized olefin. Suitable in this class are low density polyethylene, high density polyethylene and particularly polypropylene. Other plastics materials which may however be used are polystyrene or any suitable copolymer with styrene.

Again, depending on conditions and the type of material injected into the mould, the heating element may be used to ensure fusion between the formed pipe end and the fresh material being injected. Also, filler and/or reinforcing material may be added to the plastics material and one particularly suitable mixture has been found to be foamed polypropylene and up to 50% filler and glass fibre treated for bond strength.

The method of manufacture according to this invention may be varied without departing from the scope of the invention. In particular, the method is not limited to the use of the parts and arrangement of parts described above. For instance, where a pipe is to be made with more than four longitudinal ribs, more than two female mould members will be used. It is considered that a pipe may also be made with metal reinforcing moulded therein.

Figure 3A:
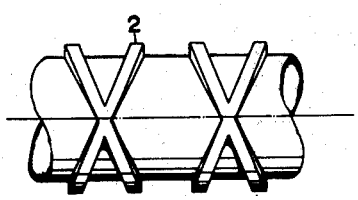
FIG. 3a and FIG. 3b illustrate alternative rib designs of the pipe.
Figure 3B:
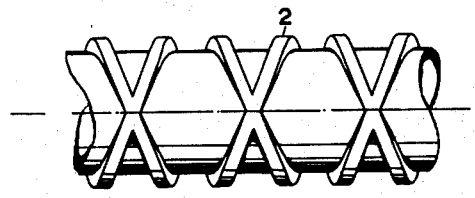

The transverse ribs 2 may also be different and in particular the discontinuous ribs may be inclined to the pipe axis and crossed, as shown in FIG. 3a. It is furthermore considered that continuous helical crossed ribs shown in FIG. 3b may be used as opposed to the discontinuous ribs 2 described above.

It is to be appreciated that the present invention allows pipes to be manufactured relatively inexpensively. This is due to a number of reasons:

Firstly, for pipes of a particular diameter, only one moulding apparatus need be employed to produce a pipe of any desired length. This feature represents a considerable advance in the art of large diameter pipe manufacture. The step-wise manufacture of a solid plastics continuum is not considered novel per se, one such application being taught, for instance, by E. H. Fisher in U.S. Pat. No. 3,192,298 (Ser. No. 126,029) filed July 24, 1961. However, in the moulding of a solid continuum, a core or male mould is not employed and heat dissipation is consequently restricted. In the present invention, increased heat dissipation, particularly when large diameter pipes are manufactured, is encountered, but it has been found that the mould material may reheat and softens the inner end of the formed pipe to facilitate the fusion described above. In cases where the inner pipe end does not reheat sufficiently, the invention provides for the additional heating of this end or the maintaining of the pipe end in a sufficiently soft state to fuse with the injected material. Furthermore, the jointing of the formed pipe with the next length is achieved not by means of mechanical interlocking (this being the case in the patent to Fisher) but is a homogeneous fusion or welding.

Secondly, a substantial saving of plastics material is obtained compared with earlier extrusion techniques. For example, an injection moulded, 200 mm diameter, unfoamed pipe of high density polyethylene having a 4 mm wall thickness and 25 mm ribs space at 200 mm intervals weighs approximately 2.7 kg/m in length. On the other hand, an extruded pipe of the same crushing strength requires an approximately 10 mm wall thickness and weighs approximately 7 kg/m of length. As can be seen, there is a significant and substantial reduction in the amount of a plastics material required for the fabrication of such articles and this is important particularly in view of the price increases in plastic which have and will probably continue to occur. The addition of filler materials represents further savings in the amount of plastics material used.

With regard to the second embodiment described above, an even further saving of plastics material is obtained, because the density of the material of the pipe can be reduced considerably in comparison with a pipe made of unfoamed material. Also, such pipes have a relatively low density making the transportation and handling thereof easier. Another advantage of this aspect is that the moulds used for moulding foamed material do not have to withstand high pressures as is known. Thus, these moulds may be made from relatively inexpensive material, for instance, cast aluminium.

In all cases, the pipes produced are inherently easier to handle than pipes of other material such as concrete and steel and are not as brittle as concrete pipes.

What we claim as new and desire to secure by letters patent is:

1. A method of making ribbed synthetic resin pipe in a stepwise manner, comprising the successive steps of: (a) forming a first length of pipe by injection moulding synthetic resin in a cavity between a male mould element and plural female mould elements, one end of said cavity being closed by a plunger and said female mould elements being configured so as to form integral ribs on an outer surface of said pipe; (b) disengaging said female mould elements from said first length of pipe; (c) advancing and guiding said plunger along said male mould element to partially eject said length of pipe from between said female mould elements; (d) retracting said plunger to close an end of said cavity; (e) engaging an end of said length of pipe between said male mould element and said female mould elements thereby closing a second end of said cavity opposite said plunger; (f) injecting further resin into said cavity to form a further length of pipe and homogeneously welding said further resin to an end of the partially ejected length of pipe; (g) repeating steps b-f to form pipe of desired length.

2. A method as claimed in claim 1 including facilitating welding of said further injected resin to said end of the partially ejected length of pipe engaged between the mould elements by heating said end by a heat source separate from said further injected resin whereby said end is softened or maintained soft.

3. A method as claimed in claim 1 in which the end of the mould cavity usually closed by the end of the moulded pipe length is closed by means of a removable closure member to mould the first length of pipe.

4. A method as claimed in claim 1 in which the female mould elements are shaped to provide transverse helical crossed ribbing on the outer surface of the pipe.

5. A method as claimed in claim 1 in which the plastics material contains filler material.

6. A method as claimed in claim 1 in which the plastics material contains up to approximately 50% filler and reinforcing material.

7. A method as claimed in claim 1 in which the plastics material contains reinforcing material.

8. A method as claimed in claim 7 in which said reinforcing material is glass fibre treated to improve bond strength between the synthetic resin and the glass fibre.

9. A method as claimed in claim 1 in which the female mould elements are shaped to provide transverse discontinuous ribbing on the outer surface of the pipe.

10. A method as claimed in claim 9 in which the female mould elements are shaped to provide said ribbing at right angles to the pipe length and to provide longitudinal ribs along the pipe joining said transverse ribs and forming pockets therebetween.

11. A method as claimed in claim 9 in which the female mould elements are shaped to provide said ribbing inclined to the pipe axis and crossed.

12. A method as claimed in claim 1 in which said thermoplastic material is foamed.

13. A method as claimed in claim 12 in which the foamed plastics material is selected from the group consisting of polymerized olefins and copolymers with styrene.

14. A method as claimed in claim 13 in which the plastics material is polypropylene.

* * * * *